United States Patent
Ibrahim et al.

(10) Patent No.: US 11,360,891 B2
(45) Date of Patent: Jun. 14, 2022

(54) ADAPTIVE CACHE RECONFIGURATION VIA CLUSTERING

(71) Applicant: ADVANCED MICRO DEVICES, INC., Santa Clara, CA (US)

(72) Inventors: Mohamed Assem Ibrahim, Santa Clara, CA (US); Onur Kayiran, Fairport, NY (US); Yasuko Eckert, Bellevue, WA (US); Gabriel H. Loh, Bellevue, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/355,168

(22) Filed: Mar. 15, 2019

(65) Prior Publication Data
US 2020/0293445 A1 Sep. 17, 2020

(51) Int. Cl.
*G06F 12/0802* (2016.01)
*G06F 12/084* (2016.01)
*G06F 12/0846* (2016.01)

(52) U.S. Cl.
CPC ........ *G06F 12/0802* (2013.01); *G06F 12/084* (2013.01); *G06F 12/0851* (2013.01); *G06F 2212/502* (2013.01)

(58) Field of Classification Search
None
See application file for complete search history.

(56) References Cited

U.S. PATENT DOCUMENTS

| 2011/0107031 | A1* | 5/2011 | Anand | G06F 12/084 711/122 |
| 2014/0189239 | A1* | 7/2014 | Hum | G06F 12/0831 711/122 |
| 2016/0203083 | A1* | 7/2016 | Park | G06F 12/0806 711/122 |
| 2016/0232091 | A1* | 8/2016 | Wang | G06F 12/084 |
| 2017/0083334 | A1* | 3/2017 | Burger | G06F 9/268 |
| 2017/0300427 | A1* | 10/2017 | Lin | G06F 12/128 |
| 2018/0113744 | A1* | 4/2018 | Borlick | G06F 12/084 |
| 2018/0307624 | A1* | 10/2018 | Zmora | G06F 12/128 |
| 2020/0099586 | A1* | 3/2020 | Li | G06F 9/45558 |

OTHER PUBLICATIONS

Hammoud et al. (Dynamic Cache Clustering for Chip Multiprocessors) ACM 978-1-60558-498-0/09/06, pp. 56-67 (Year: 2009).*
Huh et al. (A NUCA Substrate for Flexible CMP Cache Sharing), IEEE 1045-9219/07, pp. 1028-1040 (Year: 2007).*

(Continued)

*Primary Examiner* — Kaushikkumar M Patel

(57) ABSTRACT

A method of dynamic cache configuration includes determining, for a first clustering configuration, whether a current cache miss rate exceeds a miss rate threshold. The first clustering configuration includes a plurality of graphics processing unit (GPU) compute units clustered into a first plurality of compute unit clusters. The method further includes clustering, based on the current cache miss rate exceeding the miss rate threshold, the plurality of GPU compute units into a second clustering configuration having a second plurality of compute unit clusters fewer than the first plurality of compute unit clusters.

23 Claims, 8 Drawing Sheets

(56) References Cited

OTHER PUBLICATIONS

Sinharoy, B., et al., "POWER5 System Microarchitecture", IBM Journal of Research and Development, vol. 49, Issue 4.5, Jul. 2005, 17 pages.
Mcnairy, Cameron, et al., "Montecito: A Dual-Core, Dual-Thread Itanium Processor", IEEE Micro, vol. 25, Issue 2, Mar.-Apr. 2005, 11 pages.
Chishti, Zeshan, et al., "Optimizing Replication, Communication, and Capacity Allocation in CMPs", Proceedings of the 32nd Annual International Symposium on Computer Architecture, Jun. 4-8, 2005, 12 pages.
Zhang, Michael, et al., "Victim Replication: Maximizing Capacity While Hiding Delay in Tiled Chip Multiprocessors", 32nd International Symposium on Computer Architecture, Jun. 4-8, 2005, 36 pages.
Chang, Jichuan, et al., "Cooperative Caching for Chip Multiprocessors", Proceedings of the 33rd Annual International Symposium on Computer Architecture, Jun. 17-21, 2006, 12 pages.
Beckmann, Bradford M., et al., "ASR: Adaptive Selective Replication for CMP Caches", Proceedings of the 39th Annual IEEE/ACM International Symposium on Microarchitecture, Dec. 9-13, 2006, 12 pages.
Dublish, Saumay, et al., "Cooperative Caching for GPUs", ACM Transactions on Architecture and Code Optimization, vol. 13, Issue 4, Dec. 2016, 25 pages.
Zhao, Xia, et al., "LA-LLC: Inter-Core Locality-Aware Last-Level Cache to Exploit Many-to-Many Traffic in GPGPUs", IEEE Computer Architecture Letters, vol. 16, No. 1, Jan.-Jun. 2017, 4 pages.

\* cited by examiner

ADAPTIVE CACHE RECONFIGURATION VIA CLUSTERING

BACKGROUND

Many processing systems are implemented with multi-core processors in which one or more processor cores are present on a single semiconductor die. The multiple processor cores generally help to allow multiple threads or other workloads to be performed concurrently, which increases execution throughput. The processing systems often utilize a cache hierarchy including multiple levels of caches available for access by the one or more processor cores to speed access to data. Oftentimes, the processor cores include a local cache, such as a first level (L1) cache, and are further associated with other cache levels to store frequently or recently accessed data. In the course of executing instructions, a processor core may access data that is stored at a local cache from which accesses initiated by the processor core may be performed relatively quickly.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Processing units such as graphics processing units (GPUs) and general-purpose graphics processing units (GPGPUs) typically include a large number of compute units (CUs) that are configured to execute instructions concurrently or in parallel. GPUs rely on bandwidth to achieve high throughput. The sources of such bandwidth include local (i.e., private) caches, shared last level caches (LLCs), scratchpad, and memory. Many high performance computing (HPC) applications encounter performance issues due to a bandwidth bottleneck at the LLC due to the many-to-few communication between the CUs and the LLCs/L2s. Additionally, performance of various GPU applications is sensitive to the local L1 cache size of compute units (CUs). However, increasing the physical L1 cache size per CU is a costly solution for increasing L1 hit rates and decreasing the traffic to LLC.

Some applications running at the GPU possess a significant volume of sharing across their workgroups, leading to multiple copies of the same data (i.e., cache line) being accessed across different CUs. GPU L1 caches are typically software-coherent, which allows easy sharing of loads, and GPUs generally have higher latency tolerance compared to CPUs. Accordingly, overall application throughput may be improved by dynamically adjusting the level of cache line replication across L1s based on the current behavior of the running application.

To improve GPU system performance, FIGS. 1-10 illustrate methods and systems for controlling the replication levels across GPU caches via the dynamic clustering of compute units and their associated caches. In various embodiments, by decreasing the replication level across L1s, the total effective L1 cache capacity in the GPU system is increased without increasing the per CU L1 cache size, thereby increasing the L1 hit rate and decreasing the L2 accesses. In various embodiments, a method includes determining, for a first clustering configuration of CUs, whether a current cache miss rate exceeds a miss rate threshold. Based on the current cache miss rate exceeding the miss rate threshold, the CUs are clustered into a second plurality of compute unit clusters fewer than the first plurality. By forming clusters with increased number of CUs (and therefore L1 caches) and interleaving the memory address range among the CUs within a cluster, replication levels of cache lines are decreased. This resulting CU/L1 configuration, with fewer clusters and more CUs per cluster, provides for higher hit rates and reduces pressure on LLC caches.

Figure 1:
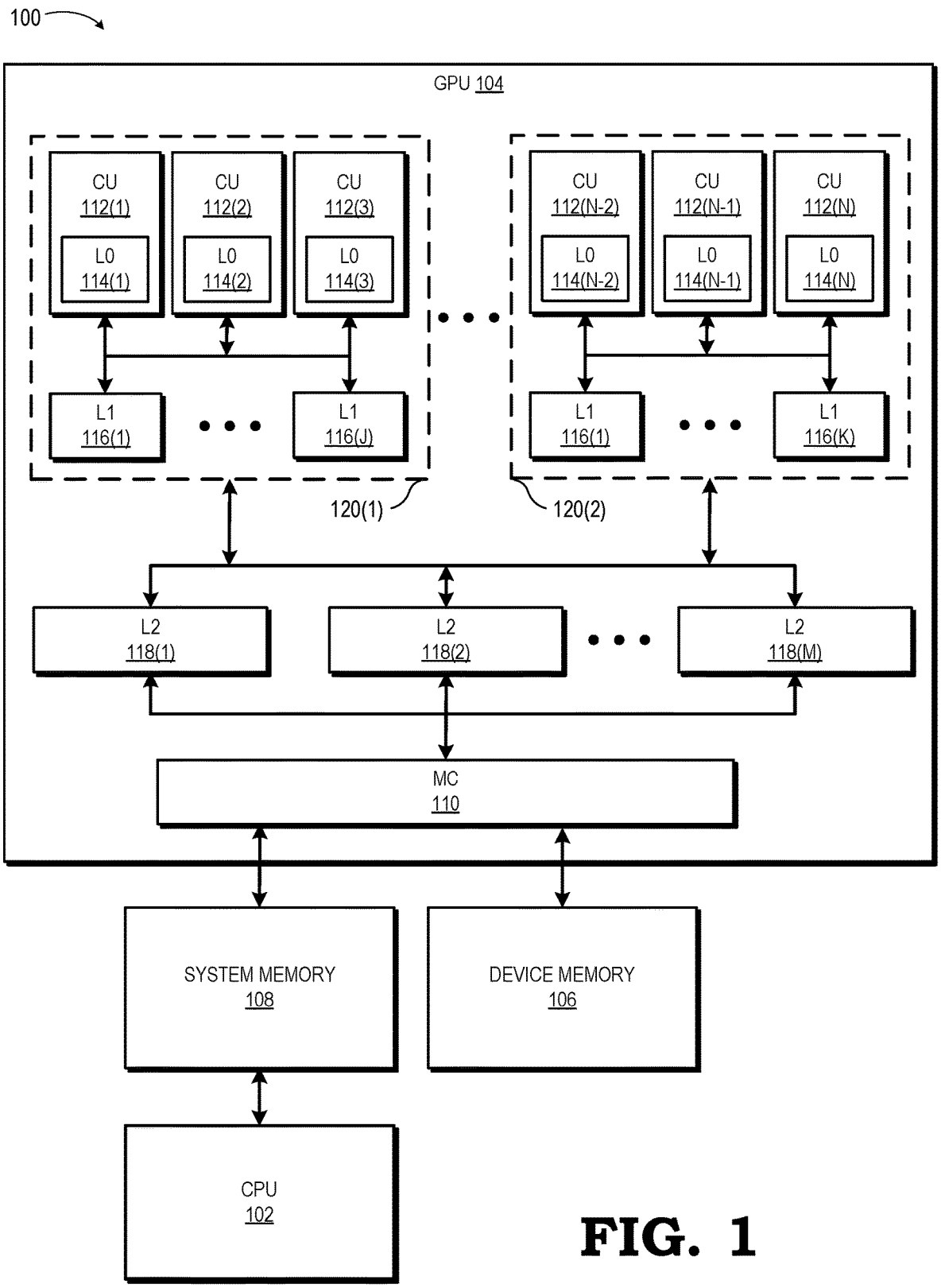
FIG. 1 is a block diagram illustrating a processing system including a memory hierarchy configured to employ clustering for adaptive cache reconfiguration in accordance with some embodiments.

FIG. 1 is a block diagram illustrating a processing system 100 including a cache and system memory hierarchy configured to employ clustering for adaptive cache reconfiguration in accordance with some embodiments. In the depicted example, the processing system 100 includes a central processing unit (CPU) 102, a GPU 104, a device memory 106 utilized by the GPU 104, and a system memory 108 shared by the CPU 102 and the GPU 104. The memories 106, 108 include any of a variety of random access memories (RAMs) or combinations thereof, such as a double-data-rate dynamic random access memory (DDR DRAM), a graphics DDR DRAM (GDDR DRAM), and the like.

As illustrated, the GPU 104 includes a memory controller 110 for managing address translation operations for one or both of the memories 106, 108 and a plurality of compute units (CUs) 112 (numbered 112(1), 112(2), 112(3), and through 112(N)). Compute units 112 may also be interchangeably referred to as GPU cores or processing cores. In various embodiments, the compute units 112 each include one or more SIMD units (not shown) that execute a thread concurrently with execution of other threads in a wavefront, such as according to a single-instruction, multiple-data (SIMD) execution model.

The memory controller 110 operates as the interface between the cache hierarchy and the system memory 108. Data to be cached in the cache hierarchy typically is manipulated as blocks of data referred to as "cache lines", and which are addressed or otherwise located in a memory hierarchy using a physical address of system memory 108. Cache lines are accessed from the system memory 108 by the memory controller 110 in response to memory requests from the GPU 104.

The GPU 104 further includes a cache hierarchy including one or more levels of data and instruction caching, such as a first level (L1), a second level (L2), a third level (L3) of caches, and the like. Each cache level includes one or more caches at that level. To illustrate, each compute unit 112 implements a first level of cache such as private level 0 (L0) cache 114, which are depicted as L0 caches 114(1), 114(2), 114(3), and through 114(N) (each L0 cache 114 associated with a corresponding one of the CUs 112(1), 112(2), 112(3), and through 112(N)). Each of these L0 caches 114 is a private cache that stores a small amount of recently used or frequently accessed data for its associated compute unit 112.

The GPU 104 also implements a second level of cache such as a shared level 1 (L1) cache 116 and a third level of cache such as a shared level 2 (L2) cache 118. The shared L1 cache 116 is depicted as L1 caches 116(1) through 116(J) and 116(K). The shared L2 cache 118 is depicted as L2 caches 118(1), 118(2), and through 118(M). The L2 caches 118 are shared by the compute units 112 of the GPU 104, and thus are also shared by at least the L0 caches 114 and L1 caches 116. In some embodiments, the shared L2 cache level represents a last-level data and/or instruction cache (LLC). The LLC represents the last cache in the cache hierarchy of the GPU 104. Although the illustrated example includes three levels, in other embodiments the cache hierarchy includes fewer than three levels or more than three levels of cache. The various levels of the cache hierarchy cache data for access and manipulation by the GPU 104. Typically, caches at a lower level (e.g., L1) tend to have lower storage capacity and lower access latencies, while caches at the higher level (e.g., L2) tend to have higher storage capacity and higher access latencies. Accordingly, cache lines of data are transferred among the caches of different cache levels so as to optimize utilization of the cache data in view of the respective caches' storage capacities and access latencies.

Due to the typical many-to-few communication pattern between the CUs 112 and last-level caches (e.g., L2 caches 118 of FIG. 1) in GPU 104, a bandwidth bottleneck problem might occur at the LLC. For example, some processing applications involve significant sharing of data across multiple workgroups (i.e., groups of threads) and result in multiple copies (i.e., replicas) of the same data (i.e., cache line) being replicated to be stored close to the requesting CUs 112. Accordingly, as described further herein, the processing system 100 dynamically clusters CUs 112 into CU clusters 120, which are depicted as CU clusters 120(1) and 120(2). CU cluster 120(1) includes CUs 112(1) through 112(N) and their respective private L0 caches 114(1) through 114(3). CU cluster 120(1) also includes shared L1 caches 116(1) through 116(J). In various embodiments, the CU cluster 120(1) shares L1 caches 116(1) through 116(J) amongst CUs 112(1) through 112(3) by interleaving the memory address range among the CUs within CU cluster 120(1) for operating the shared L1 caches 116(1)-116(J) as one logical cache. The shared L1 caches 116(1)-116(J) in CU cluster 120(1) (which are private to the CU cluster 120(1) but available for sharing to the CUs 112(1) through 112(3)) operates as a shared resource and allows for a larger effective L1 cache capacity without increasing the actual L1 cache size of each individual L1 cache 116.

Similarly, CU cluster 120(2) includes CUs 112(N-2) through 112(N) and their respective private L0 caches 114(N-2) through 114(N). CU cluster 120(2) also includes shared L1 caches 116(1) through 116(K). In various embodiments, the CU cluster 120(2) shares L1 caches 116(1) through 116(K) amongst the CUs 112 of CU cluster 120(2) by interleaving the memory address range for operating the shared L1 caches 116(1)-116(K) as one logical cache. The shared L1 caches 116(1) through 116(K) in CU cluster 120(2) (which are private to the CU cluster 120(2) but available for sharing to the CUs 112(N-2)-112(N)) operates as a shared resource and allows for a larger effective L1 cache capacity without increasing the actual L1 cache size of each individual L1 cache 116. In this manner, dynamically altering cache configuration from private (to each CU 112) to shared controls data replication levels.

Those skilled in the art will recognize that numerous details are set forth herein (e.g., specific numbers and arrangements of compute units and caches, specific groupings of compute units into clusters, specific interconnects, processor configurations, microarchitectural details, logic partitioning/integration details, sequences of operations, types, interrelationships of system components, and the like). However, it is understood that the CU clustering and cache configuration may be performed at different levels of cache and/or with different arrangements of CUs without departing from the scope of this disclosure. In other embodiments, the CU clustering may be applied to other levels of cache such as L0, L2, or lower levels in the cache hierarchy. For example, in one embodiment, rather than maintaining the L0 caches 114 as private to their respective CUs 112, the GPU may also cluster the L0 caches 114 in a manner similar to that described herein with respect to the L1 level such that the L0 caches 114 are also shared within each CU cluster 120. Thus, the L0 caches also operate as a shared resource and allows for a larger effective L0 cache capacity without increasing the actual L0 cache size of each individual L0 cache 114. Additionally, although described herein in the context of CU clustering at GPUs, those skilled in the art will recognize that in other embodiments, the CU clustering may be performed with CPU cores and the like without departing from the scope of this disclosure.

For a given number of CUs (e.g., N number of CUs 112 of FIG. 1), the number of CU clusters 120 determines a maximum number of cache line replicas at the GPU 104. Generally, increasing the number of CU clusters 120 (such as from two CU clusters in the embodiment of FIG. 1 to three or more) results in a smaller effective L1 cache capacity within each CU cluster and an increase in the number of cache line replicas at the GPU 104. Further, increasing the number of CU clusters 120 increases miss rates to the L1 caches (due to the smaller effective L1 cache capacity at each cluster) but decreases access latency to the L1 caches (due to fewer number of L1 caches at each CU cluster to traverse through for searching to locate a requested cache line). Similarly, decreasing the number of CU clusters 120 results in a decrease in the number of cache line replicas at the GPU 104 and a larger effective L1 cache capacity within each CU cluster that decreases miss rates to the L1 cache at the computational expense of longer L1 access latency. By increasing the effective L1 cache capacity, some applications may increase the L1 cache 116 hit rate, and therefore decrease L2 cache 118 pressure. Further, in some embodiments, the processing system 100 balances competing factors of the L1 cache 116 miss rate and L1 cache 116 access latency to fit a target application profile by dynamically changing the number of clusters.

Figure 2:
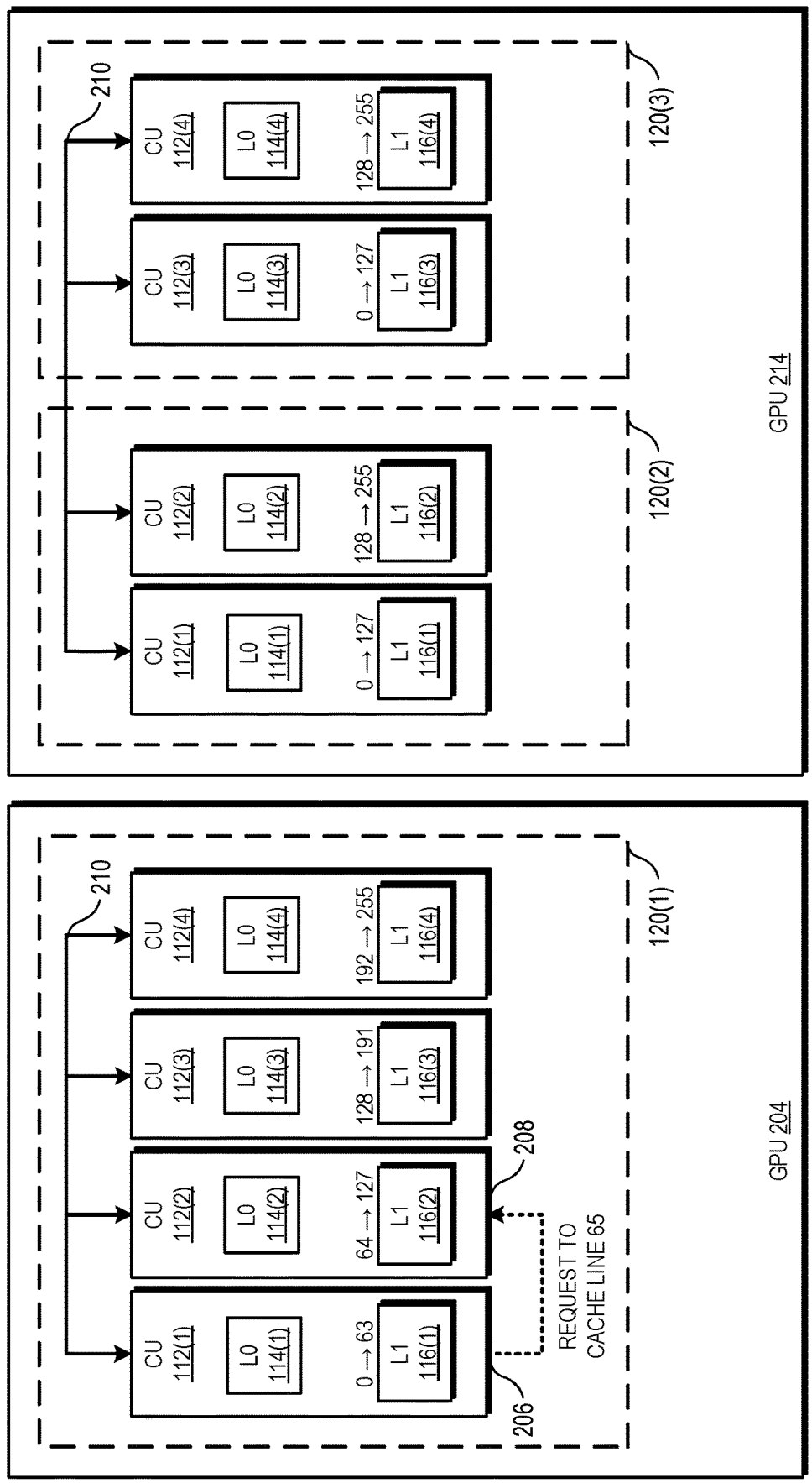
FIG. 2 is a block diagram illustrating memory address interleaving and access to shared caches of CU clusters in accordance with some embodiments.

FIG. 2 is a block diagram illustrating memory address interleaving and access to shared caches of CU clusters in accordance with some embodiments. In one embodiment, a GPU 204 (similar to the GPU 104 of FIG. 1) includes four CUs 112 (numbered 112(1), 112(2), 112(3), and 112(4)). The GPU 204 further includes a cache hierarchy including one or more levels of data and instruction caching. To illustrate, each compute unit 112 implements a first level of cache such as private level 0 (L0) cache 114, which are depicted as L0 caches 114(1), 114(2), 114(3), and 114(4) (each L0 cache 114 associated with a corresponding one of the CUs 112(1), 112(2), 112(3), and 112(4)). The GPU 204 also implements a second level of cache such as a shared level 1 (L1) cache 116. The shared L1 cache 116 is depicted as L1 caches 116(1), 116(2), 116(3), and 116(4). Although each L1 cache 116 is illustrated as being associated with a corresponding one of the CUs 112(1), 112(2), 112(3), and 112(4), those skilled in the art will recognize that there does not need to exist a one-to-one relationship between the number of CUs and L1 caches. Various embodiments may include a greater or lesser number of L1 caches per CU (e.g., such as illustrated and described with respect to FIG. 1).

The GPU 204 clusters all four CUs 112 into a single CU cluster 120(1). The CU cluster 120(1) shares L1 caches 116(1)-116(4) amongst CUs 112(1) through 112(4) by interleaving the memory address range among the CUs within CU cluster 120(1) for operating the shared L1 caches 116(1)-116(4) as one logical cache. Although the L1 caches 116 are each address-sliced such that each L1 cache 116 is mapped to a different memory address range, the shared L1 caches 116(1)-116(4) in CU cluster 120(1) operate as a shared resource and allow for a larger effective L1 cache capacity without increasing the actual L1 cache size of each individual L1 cache 116. As illustrated in FIG. 2, for a hypothetical 8-bit memory address range from 0 to 255, the GPU 204 assigns address range 0→63 to be cached at L1 cache 116(1) of CU 112(1), address range 64→127 to be cached at L1 cache 116(2) of CU 112(2), address range 128→191 to be cached at L1 cache 116(3) of CU 112(3), and address range 192→255 to be cached at L1 cache 116(4) of CU 112(4).

In one embodiment, the CU 112(1) operates as a requester CU and makes a memory access request to cache line 65 (e.g., unique cache line ID 65 associated with that memory address). As used herein, the term "requester CU" refers to the compute unit that issues the memory access request (e.g., such as to fill a cache miss to its L0 cache). The term "home CU" refers to the compute unit containing the cache memory that is assigned a particular memory address range for storing cache lines. Similarly, the term "home cache" therefore corresponds to a cache location where data for a given address may reside. Generally, a requester CU (having its own assigned address range $X_{start} \rightarrow X_{end}$) forwards a request R with address d to the home CU with assigned address range $Y_{start} \rightarrow Y_{end}$, where $d \in Y_{start} \rightarrow Y_{end}$. In embodiments where the L0 level of cache is commonly shared within each CU cluster, the requester CU forwards the memory access request to the home CU. In embodiments where the L1 level of cache is commonly shared, the requester CU forwards the memory access request to the home L1 (i.e., L1 cache with the assigned address range where data for a given address may reside).

As illustrated in FIG. 2, the requester CU 112(1) is the requester CU 206 and forwards the memory access request with cache line 65 to the home CU 208 of CU 112(2) with its assigned address range of 64→127. It should be noted that the requested cache line 65 does not necessarily need to be found in L1 cache 116(2) of the home CU 208 (i.e., the memory access request may result in a cache miss); however, a cache line corresponding to memory address 65 will always be cached in the home CU 208 instead of any other CUs 112 of CU cluster 120(1). If the memory access request results in a cache miss, then the memory access request is forwarded to the next lower level in the cache hierarchy (e.g., from L1 to L2 as opposed to other caches within the same level, given that the other L1 caches are assigned other address ranges for caching).

In another embodiment, the GPU 214 (similar to GPU 204) includes four CUs 112 (numbered 112(1), 112(2), 112(3), and 112(4)). The GPU 214 further includes a cache hierarchy including one or more levels of data and instruction caching. To illustrate, each compute unit 112 implements a first level of cache such as private level 0 (L0) cache 114, which are depicted as L0 caches 114(1), 114(2), 114(3), and 114(4) (each L0 cache 114 associated with a corresponding one of the CUs 112(1), 112(2), 112(3), and 112(4)). The GPU 204 also implements a second level of cache such as a shared level 1 (L1) cache 116. The shared L1 cache 116 is depicted as L1 caches 116(1), 116(2), 116(3), and 116(4). Although each L1 cache 116 is illustrated as being associated with a corresponding one of the CUs 112(1), 112(2), 112(3), and 112(4), those skilled in the art will recognize that there does not need to exist a one-to-one relationship between the number of CUs and L1 caches. Various embodiments may include a greater or lesser number of L1 caches per CU (e.g., such as illustrated and described with respect to FIG. 1).

The GPU 214 clusters CUs 112(1) and 112(2) into a first CU cluster 120(2). The first CU cluster 120(2) shares L1 caches 116(2) and 116(2) amongst CUs 112(1) and 112(2) by interleaving the memory address range among the CUs within CU cluster 120(2) for operating the shared L1 caches 116(1) and 116(2) as one logical cache. The shared L1 caches 116(1) and 116(2) in CU cluster 120(2) thus operates as a shared resource and allows for a larger effective L1 cache capacity without increasing the actual L1 cache size of each individual L1 cache 116. For a hypothetical 8-bit memory address range from 0 to 255, the GPU 214 assigns address range 0→127 to be cached at L1 cache 116(1) of CU 112(1) and address range 128→255 to be cached at L1 cache 116(2) of CU 112(2).

Similarly, the GPU 214 clusters CUs 112(3) and 112(4) into a second CU cluster 120(3). The second CU cluster 120(3) shares L1 caches 116(3) and 116(4) amongst CUs 112(3) and 112(4) by interleaving the memory address range among the CUs within CU cluster 120(3) for operating the shared L1 caches 116(3) and 116(4) as one logical cache. The shared L1 caches 116(3) and 116(4) in CU cluster 120(3) thus operates as a shared resource and allows for a larger effective L1 cache capacity without increasing the actual L1 cache size of each individual L1 cache 116. For a hypothetical 8-bit memory address range from 0 to 255, the GPU 214 assigns address range 0→127 to be cached at L1 cache 116(3) of CU 112(3) and address range 128→255 to be cached at L1 cache 116(4) of CU 112(4).

In comparison relative to GPU 204, the greater number of CU clusters 120 in GPU 214 causes a smaller effective L1 cache capacity within each CU cluster. For example, the first CU cluster 120(2) of GPU 214 includes an effective L1 cache capacity that is approximately half of that of the CU cluster 120(1) of GPU 204. Further, each individual L1 cache 116 of GPU 214 is assigned a larger range of addresses for which it is the home cache. Accordingly, relative to GPU 204, memory access requests at the GPU 214 are more likely to result in cache misses.

The CUs 112 of GPUs 204 and 214 are communicably coupled to each other by an interconnect 210 or other type of interconnection such as crossbars. In some embodiments, the interconnect 210 includes a direct interconnect that allows for CU-to-CU communication. For example, such a direct interconnect includes a mesh interconnect in which any CU 112 communicates with another CU or L2 cache in a bounded number of hops. Accordingly, direct interconnects allow clustering of any arbitrary number of CUs 112. Further, in other embodiments, CU clusters 120 may include differing numbers of CUs 112 rather than clustering the CUs 112 of GPU 214 into two clusters (e.g., CU clusters 120(2) and 120(3)) both having an equal number of CUs 112. For example, in some embodiments, the CUs 112 may be clustered such that a first CU cluster includes three CUs and a second CU cluster includes one CU. Similarly, in other embodiments, the CUs 112 may be clustered such that a first CU cluster includes two CUs, a second CU cluster includes one CU, and a third CU cluster includes one CU.

Figure 3:
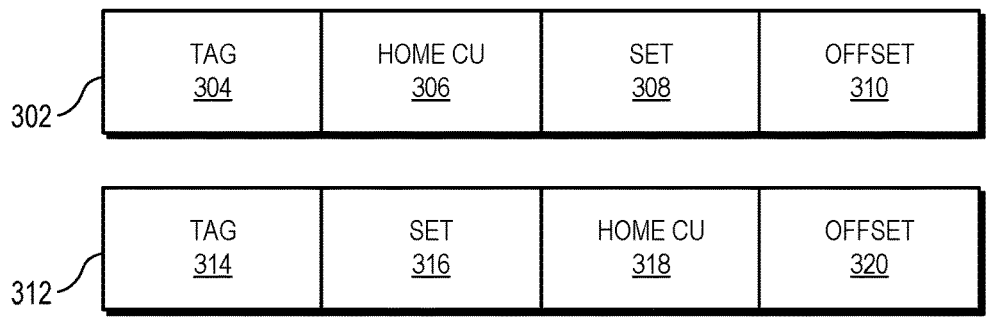
FIG. 3 is a block diagram illustrating address indexing for mapping addresses to a home compute unit in accordance with some embodiments.

The GPUs 204 and 214 also include various cache controllers (not shown) as generally known in the art for managing memory access requests from the CUs 112. In some embodiments, the cache controllers determine which of the L1 caches 116 to access for satisfying memory accesses based at least in part on the requested address. For example, FIG. 3 is a block diagram illustrating address indexing for mapping addresses to a home CU in accordance with some embodiments. The address mappings of FIG. 3 include two address mappings where a memory address includes tag, set, and offset bits for accessing the L1 cache and home CU bits for determining the home CU of the requested cache line.

In one embodiment, a first address mapping 302 maps a given address to its corresponding home CU and a set in the cache. The first address mapping 302 includes an address with tag bits 304, home CU bits 306, set bits 308, and offset bits 310 (in order from left-most bit to right-most bit). In comparison to the second address mapping 312, the first address mapping 302 positions the home CU bits 306 using higher-order bit indexing (i.e., bit positions of a binary number corresponding to larger values/the more significant digits further to the left). This higher-order bit indexing of the home CU bits 306 increases address interleaving granularity when assigning the address range across the CUs within a cluster, such as previously described with respect to FIGS. 1 and 2.

Assigning larger address ranges across the CUs sometimes lead to imbalances between a number of requests handled by each CU. In another embodiment, the second address mapping 312 maps a given address to its corresponding home CU and a set in the cache. The second address mapping 312 includes tag bits 314, set bits 316, home CU bits 318, and offset bits 320 (in order from left-most bit to right-most bit). The second address mapping 312 uses middle-order bit indexing (in contrast to the first address mapping 302) for the home CU bits 318 and higher-order bit indexing for the set bits 316. This middle-order bit indexing provides for address mapping with more fine-grain (e.g., cache line level) interleaving between the CUs, which allows for better balance across the requests received by each CU within a cluster.

Figure 4:
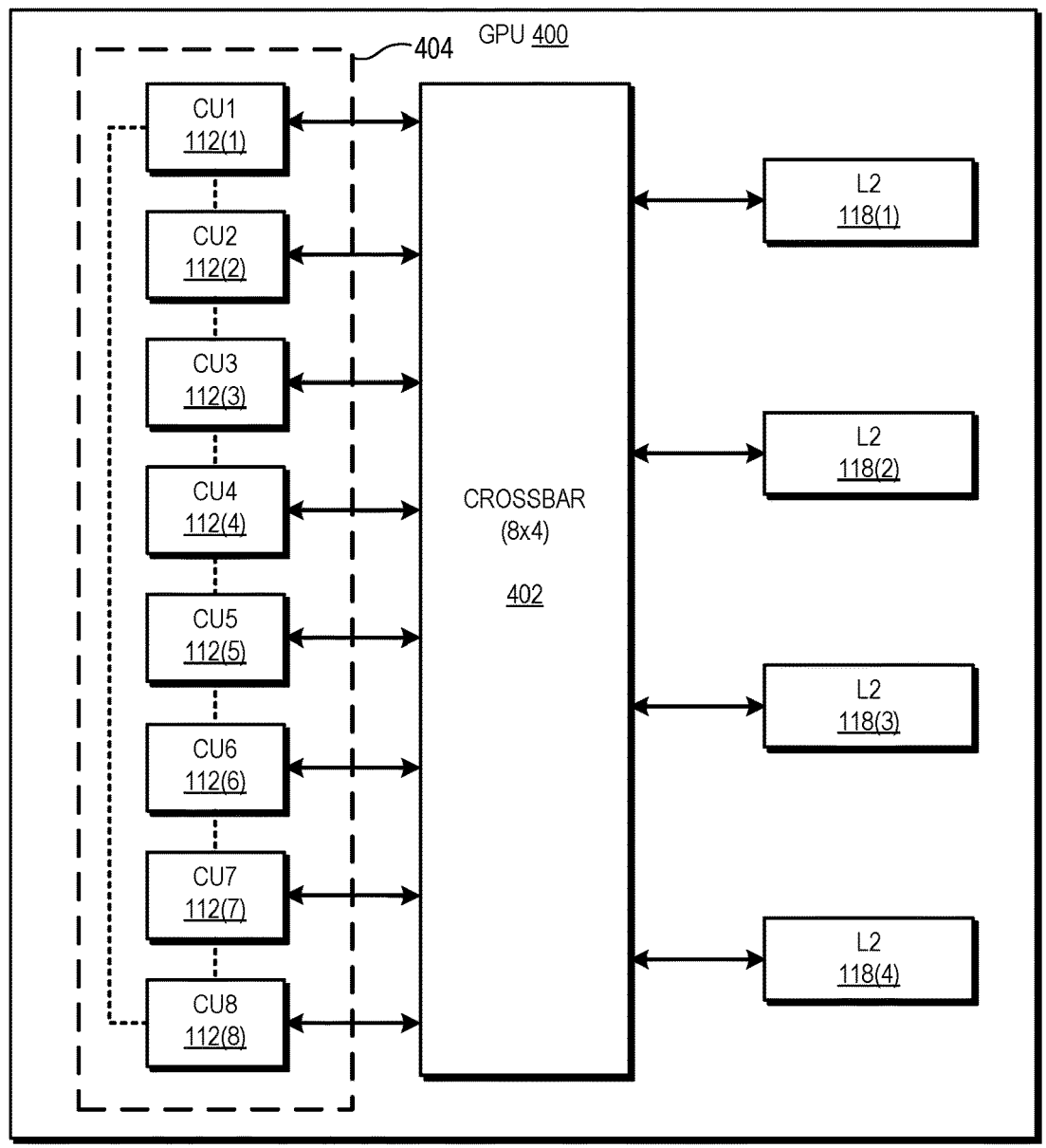
FIG. 4 is a block diagram illustrating usage of ring interconnects for enabling communications between compute units in accordance with some embodiments.

Although direct interconnects were previously discussed with respect to FIG. 2, in some embodiments, the GPUs include an indirect interconnect that does not include a communication path between the CUs by default. Such interconnects communicably couple one or more of the L0 and/or L1 levels of cache for sharing of caches within a CU cluster. FIG. 4 is a block diagram illustrating usage of ring interconnects for enabling communications between compute units in accordance with some embodiments. As shown in FIG. 4, a GPU 400 includes plurality of CUs 112 (which are depicted as CU1 112(1) through CU8 112(8)) communicate with L2 caches 118 (which are depicted as L2 caches 118(1) through 118(4)) via a crossbar 402 indirect interconnection. Accordingly, each of the CUs (i.e., CU1 112(1) through CU8 112(8)) may communicate (i.e., send and receive requests or replies to and from) the L2 caches 118 but not with another CU 112.

Figure 5:
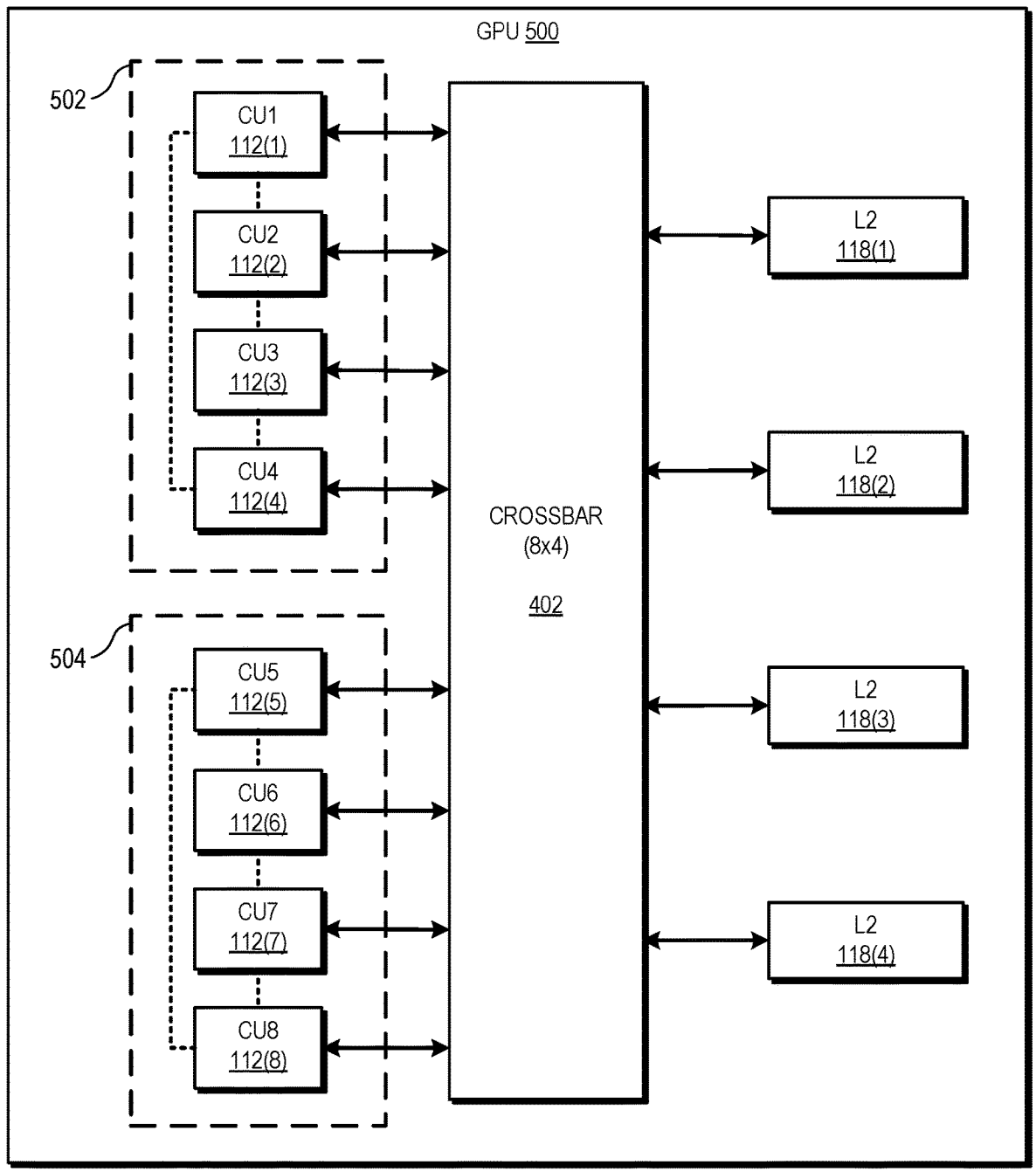
FIG. 5 is a block diagram illustrating another usage of ring interconnects for enabling communications between compute units in accordance with some embodiments.

To enable communications between CUs with indirect interconnects such as the crossbar 402, the GPU (not shown) further includes a ring interconnect 404 (i.e., in addition to crossbar 402) that communicably couples CU1 112(1) through CU8 112(8) to each other. Similarly, FIG. 5 is a block diagram illustrating another usage of ring interconnects for enabling communications between compute units in accordance with some embodiments. As shown in FIG. 5, a GPU 500 includes a plurality of CUs 112 (which are depicted as CU1 112(1) through CU8 112(8)) communicate with L2 caches 118 (which are depicted as L2 caches 118(1) through 118(4)) via a crossbar 402 indirect interconnection. A first ring interconnect 502 communicably couples CU1 112(1) through CU4 112(4). A second ring interconnect 504 communicably couples CU4 112(5) through CU8 112(8). Accordingly, each of the two ring interconnects 502, 504 connects four different CUs 112, respectively.

Augmenting the crossbar 402 with the ring interconnect 404 (and also ring interconnects 502 and 504 in FIG. 5) allows for the dynamic clustering of CUs 112 by providing the CU-to-CU communication required to transmit communications between a requestor CU and other CUs in a cluster (including the home CU containing the cache memory that is assigned to cache the requested memory address). The CUs 112 of FIG. 4 are each communicable with all other CUs 112. Accordingly, the crossbar 402 provides for communications similar to direct interconnects and therefore allow clustering of any arbitrary number and/or combination of CU1 112(1) through CU8 112(8). The single ring interconnect 402 enables all clustering options since there is a communications path between any two CUs in the system. For example, all the CU1 112(1) through CU8 112(8) may be clustered into a single CU cluster (in a manner similar to that previously described with respect to GPU 204 of FIG. 2) to provide for a single logical L1 cache.

In contrast, the ring interconnect 502 of FIG. 5 provides for a communication path between CUs 112(1) through 112(4) and the ring interconnect 504 provides for a communication path between CUs 112(5) through 112(8). However, the CU communications topology of FIG. 5 does not enable a shared L1 cache model (i.e., one single CU cluster) as there exists no communication path between various CU pairs. For example, CU 112(1) is not communicable with any of CUs 112(5) through 112(8). Accordingly, clustering may be provided between CUs with a CU-to-CU communications path. In various embodiments, the available clustering options group the CUs into two (as shown in FIG. 5), four (e.g., CU1 and CU2 belonging to one cluster, CU3 and CU4 to another, and the like), and eight (i.e., the default private L1 cache model) clusters. Additionally, in other embodiments, clustering may include an uneven split of CUs per cluster.

Figure 6:
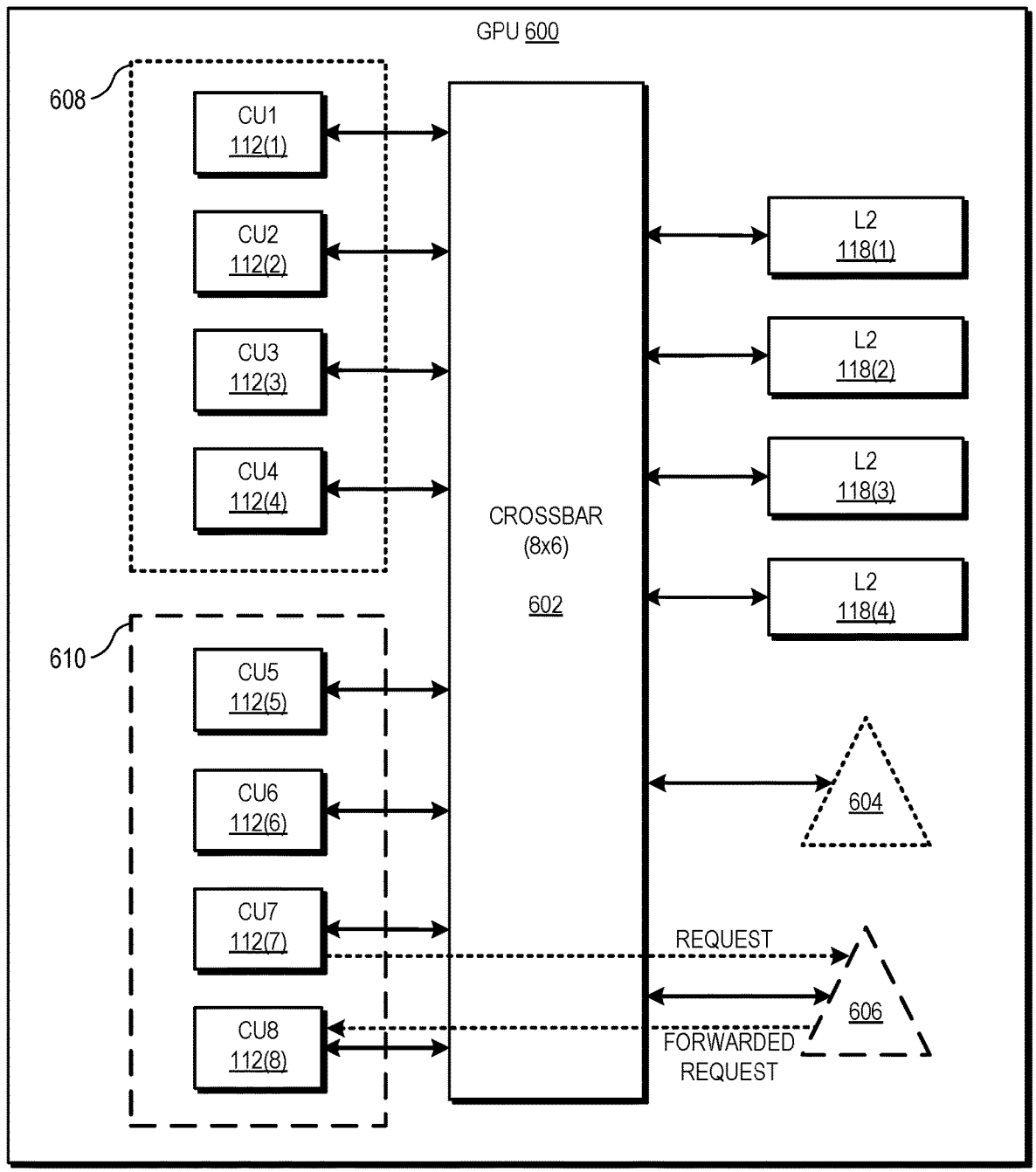
FIG. 6 is a block diagram illustrating usage of dummy communication nodes with indirect interconnects for enabling communications between compute units in accordance with some embodiments.

Transmitting communications between a requestor CU and other CUs in a cluster (including the home CU containing the cache memory that is assigned to cache the requested memory address) with the use of address-sliced L1 caches requires a CU-to-CU communications path. FIG. 6 is a block diagram illustrating usage of dummy communication nodes with indirect interconnects for enabling communications between compute units in accordance with some embodiments. The GPU 600 includes a plurality of CUs 112 (which are depicted as CU1 112(1) through CU8 112(8)) that communicate, via a crossbar 602 indirect interconnection, with L2 caches 118 (which are depicted as L2 caches 118(1) through 118(4)) and one or more dummy communication nodes 604, 606. The crossbar 602 is an 8×6 crossbar for providing for communications between eight CUs on one side of the interconnect and 4 L2 caches 118 with the two dummy communication nodes 604, 606 on the other side of the interconnect.

Rather than utilizing ring interconnects for CU-to-CU communication (such as previously discussed with respect to FIGS. 4-5), the GPU 600 of FIG. 6 positions one or more dummy communication nodes (e.g., dummy communication nodes 604, 606) on a side opposite that of the CUs 112 to receive requests from a CU and forward the requests to other CUs 112. As used herein, the term "dummy communication node" refers to a module or other structure that receive a request/reply from a CU, buffers the request/reply, and then forwards the request/reply to a destination CU. The dummy communication node 604, 606 is implemented as hard-coded logic, as firmware or programmable logic, or a combination thereof.

As illustrated in FIG. 6, CU7 112(7) sends a memory access request via crossbar 602 to the dummy communication node 606. The dummy communication node 606 determines that the memory access request corresponds to a memory address range assigned to CU8 112(8) and forwards the memory access request to the destination CU (i.e., CU8 112(8)). Though not depicted for ease of illustration, the reply communication from CU8 112(8) also utilizes dummy communication node 606 as an intermediary. For example, CU8 112(8) returns a reply (e.g., a cache hit) via crossbar 602 to the dummy communication node 606. The dummy communication node 606 then forwards the reply (e.g., the cache hit) to the original requesting CU (i.e., CU7 112(7)). Accordingly, the dummy communication nodes 604, 606 provide a communication path between any two CUs 112 in the GPU 600.

The GPU 600 clusters CUs 112(1) through 112(4) into a first CU cluster 608 and CUs 112(5) through 112(8) in a second CU cluster 610. In various embodiments, the dummy communication nodes may be dynamically configured to serve one or multiple CU clusters based on traffic volume to and from the CU clusters. For example, in one embodiment, if a CU cluster experiences high volume of traffic, then the GPU 600 dynamically assigns more dummy communication nodes to the highly active CU cluster. Similarly, if some clusters experience low traffic volume, then the GPU 600 dynamically assigns fewer or just a single a single dummy communication node to handle communications traffic.

Further, in some embodiments, dummy communication nodes are assigned to operate for particular clusters. For example, the dummy communication node 604 is responsible for communications between the CUs 112 of the first CU cluster 608 and the dummy communication node 606 is responsible for communications between the CUs 112 of the second CU cluster 610. In other embodiments, the dummy communication nodes are a shared resource to handle directing of any memory requests to other CUs. Those skilled in the art will recognize that the ring interconnects and dummy communication nodes described herein are provided merely for exemplary purposes. Any interconnect, bus, or other interconnection capable of communicating in the manner described herein may be utilized without departing from the scope of this disclosure.

Figure 7:
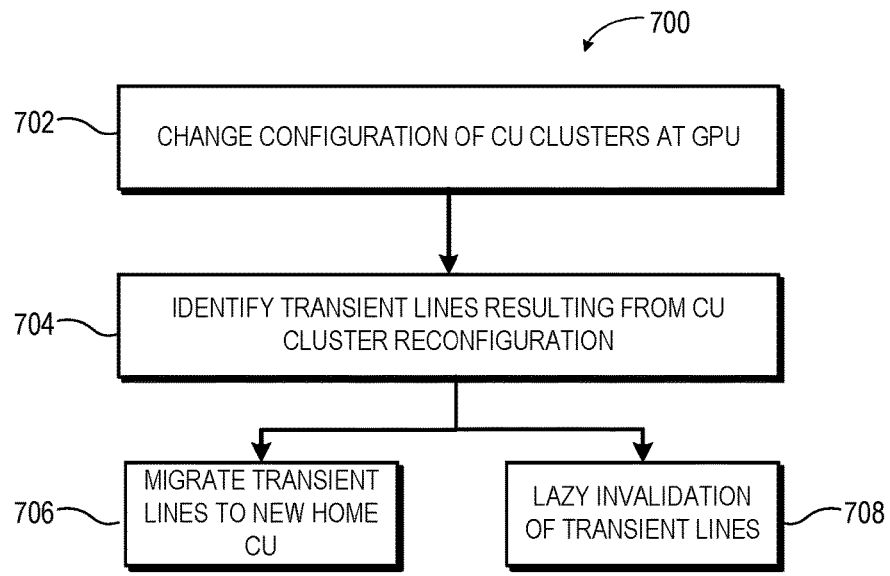
FIG. 7 is a flow diagram illustrating a method for handling transient cache lines in accordance with some embodiments.

FIG. 7 is a flow diagram illustrating a method 700 for handling transient cache lines in accordance with some embodiments. At block 702, the GPU dynamically changes the configuration of CU clusters. In various embodiments, changing the configuration of CU clusters includes changing a number of CU clusters at the GPU. For example, with reference to FIG. 2, the GPU 204 change from a single, shared L1 cache configuration (i.e., all four CUs grouped into one single CU cluster) to the configuration illustrated for GPU 214 in which two CU clusters 120(2) and 120(3) each include two CUs. As another example, the GPU may switch from a private L1 organization to an organization with N/2 clusters, where N is the number of CUs in the GPU.

At block 704, the GPU identifies transient lines resulting from the change in CU cluster configuration. As used herein, the term "transient line" refers to a cache line which is no longer mapped to the cache at which it is stored due to, for example, reconfiguration of CU clusters at the GPU. To illustrate, the dynamic change of clusters (and hence the size and number of the CU clusters) causes some cache lines to reside in L1 cache while not belonging to the current address range assigned to the CU (after the change in number of CU clusters). A resident line in an L1 cache which is no longer mapped to that cache should no longer reside in that cache and therefore becomes a transient line.

With reference to FIG. 2, a cache line associated with cache line 65 is mapped to be cached at L1 cache 116(2) in the single, shared L1 cache configuration. However, after changing the configuration of CUs 112 to form two CU clusters having two CUs each, the memory address range assigned to L1 cache 116(2) no longer includes cache line 65. Accordingly, a line associated with cache line 65 cached at L1 cache 116(2) is now a transient line. As another example, if the GPU switch from a private L1 organization to an organization with N/2 clusters (N being the number of CUs in the GPU), some cache lines may exist in an L1 cache (since the private L1 organization maps all cache lines from a CU to its associated L1) even though the L1 cache is not the home CU of that cache line under the current N/2 clustering mode. In other words, the cache line was previously stored in a private L1 cache which caches an entire address range. However, the L1 cache has now become part of a cluster and now only caches a subset of the address range.

At block 706, method 700 proceeds by migrating the transient lines to their new, current home CUs having the proper address mapping. By migrating the transient cache lines, cache misses for the migrated lines decrease. However, the migrations of the transient cache lines may incur an overhead in the interconnect for transferring the cache lines. Additionally, multiple cache lines migrating to the same set will conflict once they move to the current home CU. In some embodiments, a GPU-wide communication scheme is utilized to choose which of these conflicting cache lines to migrate, while invalidating the other transient cache lines. Such a global scheme will similarly incur overhead in the interconnect due to the communication.

At block 708, instead of the transient line migration of block 706, method 700 proceeds by performing lazy invalidation of transient cache lines during the transition between CU cluster reconfigurations instead of migrating transient cache lines. In various embodiments, lazy invalidation includes a cache line replacement policy that puts a bias towards choosing those transient lines for replacement when inserting new (i.e., correctly placed) cache lines into a given L1 cache. That is, lazy invalidation does not immediately evict transient lines but prioritizes the transient cache lines for faster eviction. For example, in some embodiments, lazy invalidation does not mark a transient line as invalid but instead biases the transient line by marking it as least recently used (LRU) such that whenever invalidation/eviction does need to occur for that L1 cache, the LRU transient cache line will be the first cache line in the L1 cache to be invalidated or evicted. These invalidated cache lines may be requested again (based on the reuse patterns) at the new home CU and thus will sometimes cause cold misses.

Figure 8:
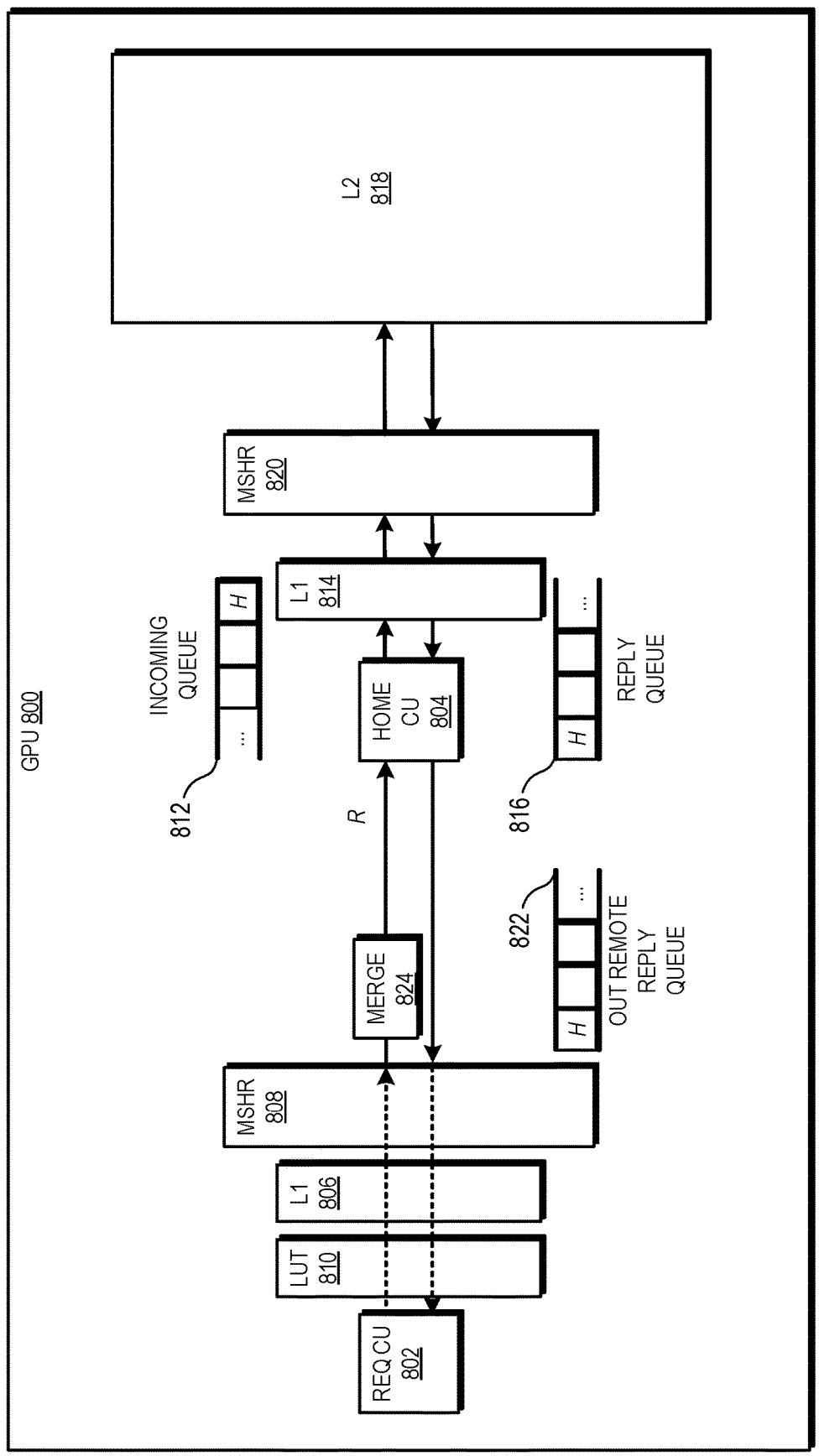
FIG. 8 is a block diagram illustrating request and reply communications flow between compute units in accordance with some embodiments.

FIG. 8 is a block diagram illustrating request and reply communications flow between CUs for CU clustering in accordance with some embodiments. As illustrated, a read request from the requestor CU 802 to the home CU 804 bypasses both the local L1 cache 806 (as it is not the home CU and therefore does not contain the requested cache line) and local miss status holding registers (MSHR) 808, which track outstanding misses from the L1 cache 806, of the requestor CU 802 (as denoted by the dashed line). Rather than relying on complex cache line replication searching schemes to locate and fetch data, the requested data at GPU 800 only resides in a single CU (within each individual CU cluster) and provides larger effective L1 cache capacity by controlling L1 cache line replication. In some embodiments, a cache controller (not shown) examines the bits of the requested address to determine that the requested address is not mapped to the requestor CU 802 such as previously described with respect to FIGS. 2 and 3. In other embodiments, the GPU 800 includes a lookup table (LUT) 810 for determining address mapping (i.e., which home CU is associated with the requested address.

As the L1 cache 806 of the requestor CU 802 is known to not contain the requested cache line, skipping the MSHR 808 increases memory level parallelism (MLP) at the GPU 800. By skipping the local MSHR 808, a read request reserves one MSHR entry at the home CU 804 instead. This saves MSHR entries at the local MSHR 808 for more unique read requests, which increases the number of requests going to L2 cache 818, thereby increasing MLP.

The request R (e.g., a read or write) from requestor CU 802 is added to an incoming queue 812 at the home CU 804 for processing. In some embodiments, an arbitration unit (not shown) chooses either a local request (e.g., request generated by the home CU 804) or the head request H from the incoming queue 812 for processing at the home CU L1 cache 814. If the request R results in a cache hit at the L1 cache 814 of home CU 804, a reply (e.g., read reply or write acknowledgement) is added to the reply queue 816 of the home CU 804 to be returned to the requestor CU 802. If the request R results in a cache miss at the L1 cache 814 of home CU 804, then the request R is sent to the next lower level of the cache hierarchy (i.e., L2 cache 818) by going through the home node MSHR 820.

After receiving the reply from L2 cache 818, the home node 804 adds the reply (e.g., read reply or write acknowledgement) to the reply queue 816. The reply queue 816 subsequently returns the request to the requestor CU 802. As the requestor CU MSHR 808 was initially bypassed, the MSHR 808 does not handle replies at the requestor CU 802. Instead, the reply (i.e., transmitted from reply queue 816 of the home CU 804) is sent to the out remote reply queue 822 for handling of replies at the requestor CU 802.

As previously discussed, the MSHR 808 is bypassed for read requests and is therefore not aware of outstanding requests and multiple misses to the same address. If there are multiple misses to the same address while a first request to the address is still outstanding, the request does not need to be sent again from the requestor CU 802 to home CU 804. Accordingly, in some embodiments, the GPU 800 includes a merged entry 824 that includes a small capacity register (generally smaller in capacity than MSHR 808). In various embodiments, the merged entry 822 is a single-entry register.

A request R (generally a read request) that bypasses the MSHR 808 is added to the merged entry 824. If a next request (not shown) generated by the requestor CU 802 is to the same cache line address as the request R address stored at the merged entry 824, then the requestor CU 802 merges the next request into the previous request R and does not forward the next request to the home CU 804. The requestor CU 802 repeats this merging process until a request that skips the MSHR 808 has a different cache line address than the merged request stored at the merged entry 824. After a new cache line request is received, the merged request (stored at the merged entry 824) is sent to the home CU 804 and the new cache line request replaces the previous entry at the merged entry 824. The new entry at the merged entry 824 repeats the above process of waiting for possible merging based on subsequent requests. After the request is fulfilled, all CUs (or threads) contributing to the merged entry receives the data. In this manner, the merged entry 824 ensures only one request for the same address is transmitted to the cache hierarchy at a given time and decreases the number of requests forwarded to the home CU.

In various embodiments, the capacity of the merged entry 824 register determines its operations. Although described above in the context of a single register for the tracking of one address, the merged entry may include two or more registers in other embodiments. In such embodiments, the merged entry 824 tracks two or more different addresses and delays sending the requested addresses to the home CU 804 until at least a third (or more) different address is requested by the requestor CU 802. Additionally, in some embodiments, a timeout mechanism triggers the merged request to be sent to the home CU 804 if no additional request arrives to the merged entry 824 in the last n cycles to prevent stalling.

Figure 9:
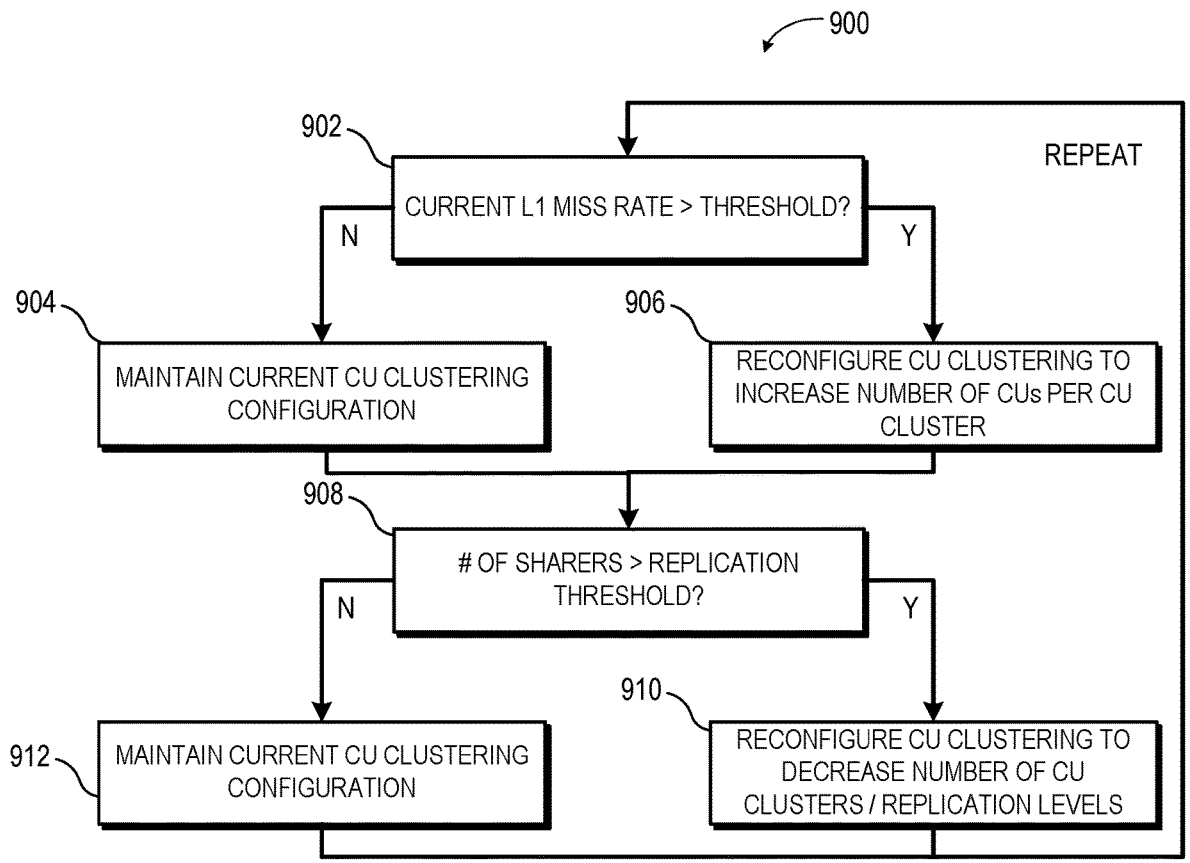
FIG. 9 is a flow diagram illustrating a method of changing the configuration of compute unit clustering in accordance with some embodiments.

FIG. 9 is a flow diagram illustrating a method 900 of changing the configuration of compute unit clustering in accordance with some embodiments. At block 902, the GPU (such as any of the GPUs described herein with respect to FIGS. 1-8) compares a current L1 miss rate for the current clustering configuration against a pre-determined miss rate threshold. The L1 miss rate determines whether the GPU should keep using the current clustering configuration or reconfigure to a more fine-grained address interleaving (i.e., fewer clusters and more CUs per cluster). For example, if an application, under a clustering configuration $C_n$ where n is the number of CUs per cluster, has a low L1 miss rate (e.g., <5%), then it is better to keep using this current clustering configuration, as the current cache capacity provides a high hit rate. Any boost from an increased effective L1 cache capacity achieved by using fewer CU clusters (and therefore more CUs L1 caches per cluster) will be negated by an increase in L1 cache access latency due to an increased number of hops from the requestor CU to the home CU.

If the current L1 miss rate for the current clustering configuration does not exceed the pre-determined miss rate threshold, the method 900 proceeds to block 904, where the GPU maintains the current CU clustering configuration. However, if the current L1 miss rate for the current clustering configuration exceeds the pre-determined miss rate threshold, the method 900 proceeds to block 906 where the GPU changes the clustering configuration to increase the number n of CUs (and therefore L1 caches) per CU cluster.

With reference to FIG. 2, the GPU determines that a current clustering configuration $C_2$ (e.g., clusters 120(2) and 120(3)) with two CUs per CU cluster results in L1 miss rates exceeding the pre-determined miss rate threshold. This indicates that increasing the effective L1 cache capacity for each CU cluster (by increasing the number of CUs/L1 caches) per CU cluster would improve L1 hit rates and reduce pressure on the next lower level of cache in the cache hierarchy. Accordingly, the GPU increases the number of CUs per CU cluster from a first number (e.g., two CUs 112 per CU cluster 120(2)/120(3) in FIG. 2) to a second number greater than the first number (e.g., four CUs 112 in the CU cluster 120(1) of FIG. 2).

The method 900 optionally includes a second metric for determining whether to change the configuration of compute unit clustering. Continuing on to block 908 from blocks 904 and 906, the GPU (such as any of the GPUs described herein with respect to FIGS. 1-8) compares a number of sharers of each particular cache line against a pre-determined sharer threshold. As previously discussed with respect to FIG. 1, the L2 level is a shared level of cache amongst all CUs of the GPU. Accordingly, there is only one L2 cache that can cache any given line. In some embodiments, a cache controller at the L2 cache tracks a number of L1 caches requesting each particular cache line. In other embodiments, a coherence directory (not shown) at the GPU estimates the volume of sharing across CUs.

If the number of sharers is high (i.e., same cache line requested by a large number of L1 caches) such that it exceeds a pre-determined replication threshold, the GPU is experiencing high levels of replication. High levels of replication may affect the effective L1 cache capacity. Accordingly, if the number of sharers exceeds the pre-determined replication threshold, the method proceeds to block 910 where the GPU decreases the number of CU clusters to achieve a more shared organization structure and decrease the levels of cache line replication (and also decrease the number of CU clusters). If the number of sharers does not exceed the pre-determined replication threshold, the method proceeds to block 912 where the GPU maintains the current CU clustering configuration.

If the current L1 miss rate for the current clustering configuration does not exceed the pre-determined miss rate threshold, the method 900 proceeds to block 904 where the GPU maintains the current CU clustering configuration. However, if the current L1 miss rate for the current clustering configuration exceeds the pre-determined miss rate threshold, the method 900 proceeds to block 906 where the GPU changes the clustering configuration to increase the number n of CUs (and therefore L1 caches) per CU cluster. Further, the GPU returns to block 902 (from blocks 910 and 912) to continue monitoring L1 cache hit/miss rates and to determine whether further cache reconfiguration is needed.

In some embodiments, the GPUs and CUs implement hard-coded logic, firmware or programmable logic, or a combination thereof, to determine whether to change the configuration of compute unit clustering. In the centralized approach, all the CUs 112 periodically send the aggregated locally collected data to the centralized entity (e.g., can be a CU at the GPU) for processing. In other embodiments, the GPU utilizes a distributed hierarchal approach. In the distributed hierarchal approach, the CUs 112 within a cluster communicate among themselves to trade the local information collected. If a decision to decrease the clusters number (more CUs per CU cluster) is taken, then a communication with a candidate CU from each of the other cluster is performed to reach a global decision. For example, a first CU cluster can locally decide to break its CUs to more clusters, while another CU cluster may decide to not change its clustering granularity.

Adjacent clusters that decide to decrease their clustering granularity (i.e., more CUs per CU cluster) may communicate to form a cluster with more CUs. These schemes can lead to a system with different CU cluster sizes at the same time. Such multi-grain clusters may be appropriate in a virtualized GPU system. The exchange of information can be done in an opportunistic way. In other words, in various embodiments, a CU transmits the collected local information to another CU as a separate one-flit packet or piggybacks the collected information on an outgoing request/reply to another CU.

In some embodiments, the GPU monitors L1 cache miss rate to determine if a request should bypass the home CU and proceed directly to L2 cache. Specifically, if the number of cluster decreases (and therefore the effective L1 cache size decreases) and the L1 miss rate remains high (e.g., >95%), then the application does not benefit from the L1 cache. Under such case, it is better to forward the request directly to L2 as it will probably miss at the home CU L1. In other embodiments, the GPU monitors the interconnect path state to the home CU or L2 cache. By monitoring the interconnect injection and ejection buffers at the home CU or L2 cache, the GPU estimates how busy they are, and transmits to the node that is less congested. For example, if a home CU has a large number of replies in the reply queue, then the injection buffer also shows higher activity. However, if the incoming queue contains many requests, then the ejection buffer also shows higher activity. The buffers information can be exchanged using the same centralized or distributed approaches mentioned before for determining CU clustering.

Some memory address ranges are more active than others during the different execution phases of application. In other words, requests are more targeted to these ranges and are not uniformly accessing the remaining address ranges. This imbalance translates to imbalance between the requests received by some CUs that are assigned that active range. As previously discussed, a fine-grained interleaving at the cache line granularity to ensure better distribution or dynamically increasing the number of clusters (decreasing the CUs per CU cluster) to better distribute the processing load.

Figure 10:
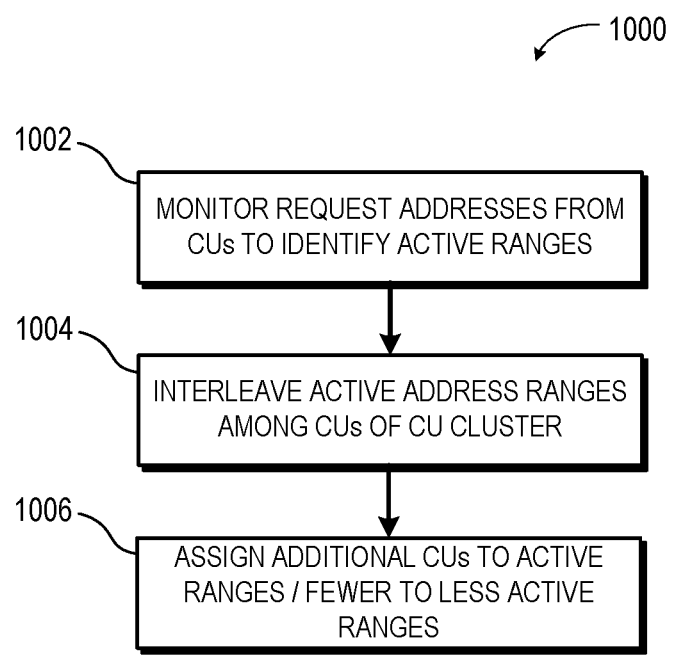
FIG. 10 is a flow diagram illustrating a method of changing interleaving of address range among compute units in accordance with some embodiments.

In another embodiment, FIG. 10 is a flow diagram illustrating a method 1000 of changing interleaving of address range among compute units in accordance with some embodiments. At block 1002, the GPU (such as any of the GPUs described herein with respect to FIGS. 1-8) monitors request addresses sent by the CUs to identify active memory address ranges. In various embodiments, monitoring request addresses includes identifying one or more active memory address ranges more active than one or more less active address ranges. In other embodiments, the GPU also monitors the incoming queue size at each CU.

At block 1004, the GPU interleaves the identified active memory address ranges among the CUs of the same CU cluster. In some embodiments, the GPU also sends requests address the less active memory ranges directly to L2, thereby bypassing the home CU.

At optional block 1006, the GPU assigns additional CUs (and therefore L1 caches) to the active ranges and fewer CUs to the less active ranges instead of sending requests directly to L2 for less active address ranges. As previously discussed with respect to FIGS. 1-8, non-uniform distribution of the memory address range may result from clustering an arbitrary number of CUs (e.g., clustering four CUs into two clusters of one and three CUs, respectively, instead of two CUs per cluster). For this approach, the GPU tracks the address-to-L1 mapping per core via a table so that a CU can correctly forward a request to the current home CU.

Based on the workgroup dispatcher behavior, some CUs may be assigned more workgroups to process. This may translate to work imbalance between the CUs. As a result, a cluster that has CUs that are assigned with more workgroups will have more activity compared to other clusters. As an extreme case, some clusters have CUs that are assigned work, while other clusters have little to no activity since their CUs have completed their assigned workgroups.

In some embodiments, the GPU (such as any of the GPUs described herein with respect to FIGS. 1-8) includes a cluster-aware workgroup dispatcher that assigns the workgroups to CUs so that there is a balance between the work per each cluster. When dynamically changing the cluster size, the assigned work per each cluster may be unbalance. A reassignment of workgroups may be utilized to balance the workload per cluster. In other embodiments, the GPU dynamically identifies the CUs with more workload and distribute them to different clusters. This approach may lead to irregular cluster shapes and non-uniform distribution of the memory address range. However, it is preferable to keep the CUs of a given cluster nearby (for the physical distance on the die); the CU-to-Cluster assignment may be changed if the CU is on the border of another cluster.

GPU L1 caches are typically small in capacity have higher miss rates compared to CPU L1 caches. Further, GPUs often experience performance limitations due to LLC bandwidth in some workloads. Accordingly, the CU clustering discussed herein reduces pressure on LLC and increases compute performance by improving L1 hit rates.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
   determining whether a current cache miss rate across a first clustering configuration exceeds a miss rate threshold, wherein the first clustering configuration comprises a plurality of compute units clustered into a first plurality of compute unit clusters;
   clustering, based on the current cache miss rate exceeding the miss rate threshold, the plurality of compute units into a second clustering configuration comprising a second plurality of compute unit clusters fewer than the first plurality of compute unit clusters; and
   responsive to determining that at least one transient line exists, migrating the at least one transient line from a first cache to a second cache in the second clustering configuration, wherein the at least one transient line comprises a cache line residing in the first cache and corresponding to a memory address that is not mapped to a current address range assigned to the first cache in the second clustering configuration.

2. The method of claim 1, wherein at least one level of cache memory is commonly shared within each of the second plurality of compute unit clusters.

3. The method of claim 2, wherein the at least one level of cache memory is a L1 cache.

4. The method of claim 3, wherein clustering the plurality of compute units into the second clustering configuration increases a number of L1 caches shared within a first compute unit cluster of the second plurality of compute unit clusters.

5. The method of claim 4, wherein the increased number of L1 caches shared within the first compute unit cluster increases an effective L1 cache capacity.

6. The method of claim 4, further comprising:
assigning an interleaved memory address range to each of the number of L1 caches shared within the first compute unit cluster.

7. The method of claim 6, further comprising:
identifying, based on the assigned interleaved memory address range for the number of L1 caches, the transient line residing in a first L1 cache of the number of L1 caches, wherein the memory address is not mapped to the first L1 cache in the second clustering configuration.

8. The method of claim 7, further comprising:
marking the transient line for prioritized eviction by marking as least recently used (LRU).

9. The method of claim 1, wherein the plurality of compute units comprise a plurality of graphics processing unit (GPU) compute units.

10. A non-transitory computer readable medium embodying a set of executable instructions, the set of executable instructions to manipulate at least one processor to:
determine whether a current cache miss rate across a first clustering configuration exceeds a miss rate threshold, wherein the first clustering configuration comprises a plurality of compute units clustered into a first plurality of compute unit clusters;
cluster, based on the current cache miss rate exceeding the miss rate threshold, the plurality of compute units into a second clustering configuration comprising a second plurality of compute unit clusters fewer than the first plurality of compute unit clusters; and
responsive to at least one transient line existing, migrate the at least one transient line from a first cache to a second cache in the second clustering configuration, wherein the at least one transient line comprises a cache line residing in the first cache and corresponding to a memory address that is not mapped to a current address range assigned to the first cache in the second clustering configuration.

11. The non-transitory computer readable medium of claim 10, wherein at least one level of cache memory is commonly shared within each of the second plurality of compute unit clusters.

12. The non-transitory computer readable medium of claim 11, wherein the at least one level of cache memory is a L1 cache.

13. The non-transitory computer readable medium of claim 10, wherein clustering the plurality of compute units into the second clustering configuration increases a number of L1 caches shared within a first compute unit cluster of the second plurality of compute unit clusters.

14. The non-transitory computer readable medium of claim 13, wherein the increased number of L1 caches shared within the first compute unit cluster increases an effective L1 cache capacity.

15. The non-transitory computer readable medium of claim 13, the set of executable instructions to further manipulate at least one processor to:
assign an interleaved memory address range to each of the number of L1 caches shared within the first compute unit cluster.

16. The non-transitory computer readable medium of claim 15, the set of executable instructions to further manipulate at least one processor to:
identify, based on the assigned interleaved memory address range for the number of L1 caches, the transient line residing in a first L1 cache of the number of L1 caches, wherein the memory address is not mapped to the first L1 cache in the second clustering configuration.

17. The non-transitory computer readable medium of claim 16, the set of executable instructions to further manipulate at least one processor to:
mark the transient line for prioritized eviction by marking as least recently used (LRU).

18. The non-transitory computer readable medium of claim 10, wherein the plurality of compute units comprise a plurality of graphics processing unit (GPU) compute units.

19. An apparatus, comprising:
a processing unit comprising a plurality of compute units clustered into a first plurality of compute unit clusters for a first clustering configuration, wherein at least one level of cache memory is commonly shared within each of the first plurality of compute unit clusters, wherein the processing unit is configured to:
determine whether a current cache miss rate across the first clustering configuration exceeds a miss rate threshold;
cluster, based on the current cache miss rate exceeding the miss rate threshold, the plurality of compute units into a second clustering configuration comprising a second plurality of compute unit clusters fewer than the first plurality of compute unit clusters; and
responsive to at least one transient line existing, migrating the at least one transient line from a first cache to a second cache in the second clustering configuration, wherein the at least one transient line comprises a cache line residing in the first cache and corresponding to a memory address that is not mapped to a current address range assigned to the first cache in the second clustering configuration.

20. The apparatus of claim 19, wherein the at least one level of cache memory is a L1 cache.

21. The apparatus of claim 19, wherein clustering the plurality of compute units into the second clustering configuration increases a number of caches at a same cache level that are shared within a first compute unit cluster of the second plurality of compute unit clusters.

22. The apparatus of claim 21, wherein the increased number of caches at the same cache level that are shared within the first compute unit cluster increases an effective cache capacity at the same cache level.

23. The apparatus of claim 19, wherein the processing unit comprises a graphics processing unit (GPU) and the plurality of compute units comprise a plurality of GPU compute units.

* * * * *